Dec. 27, 1966　　D. H. FISH ETAL　　3,294,592
IMMERSION THERMOCOUPLE ASSEMBLY
Filed Sept. 11, 1959
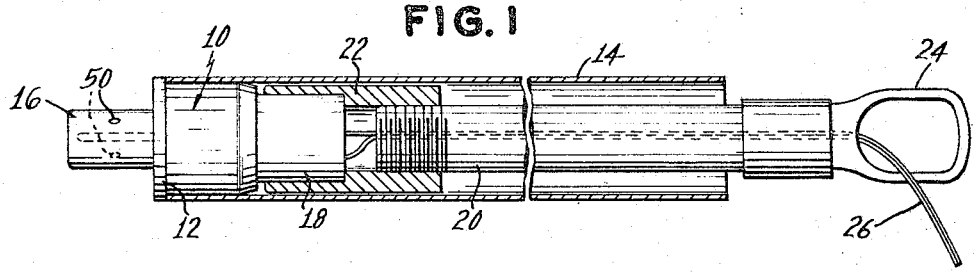
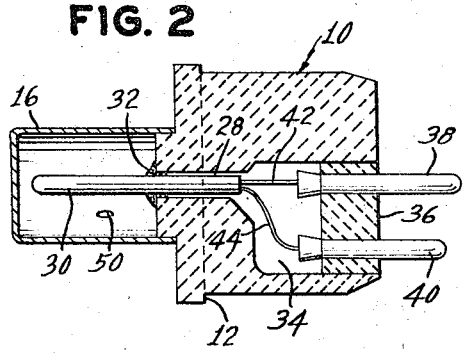
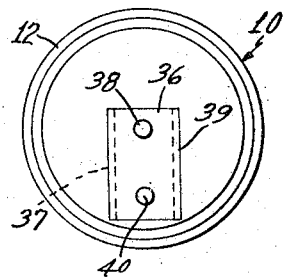
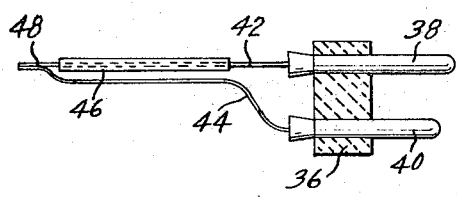
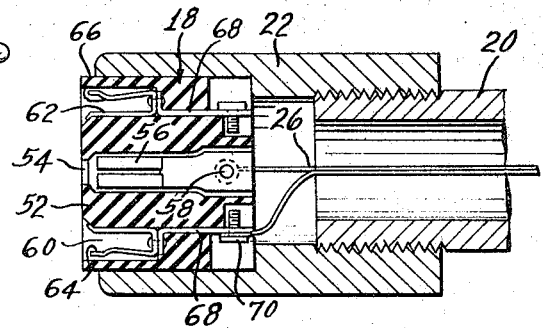
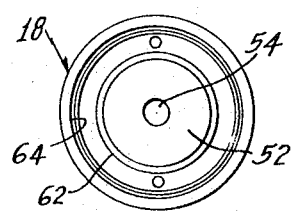
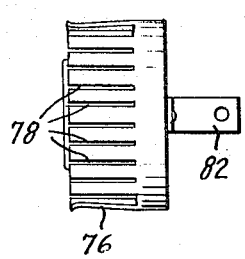
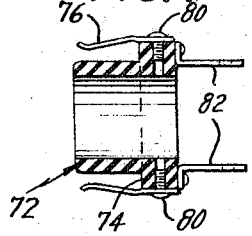
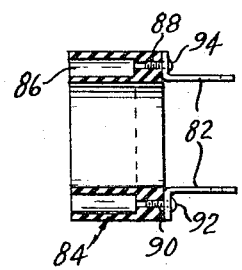
INVENTORS
DONALD H. FISH
JOSEPH O. ACCIANI
BY Karl Huber
James E. Bryan
Alan C. Rose
ATTORNEYS 3,294,592
IMMERSION THERMOCOUPLE ASSEMBLY
Donald H. Fish, Livingston, and Joseph O. Acciani, Newark, N.J., assignors, by mesne assignments, to Leeds & Northrup Company, a corporation of Pennsylvania
Filed Sept. 11, 1959, Ser. No. 839,506
7 Claims. (Cl. 136—234)

This invention relates to thermocouple assemblies and, more particularly, to devices of this type for measuring the temperature of molten metal.

In the field of metallurgy, there are numerous instances in which the temperature of molten metals must be measured. As a specific example, the control of the temperature of steel in both open hearth and electric furnaces is necessary for various reasons well known in the art. Generally, readings must be taken several times during the melting process of one batch. Devices using thermocouples have been developed which are immersed into the molten mass by means of an elongated handle supporting a sensing head which in turn supports the sensing thermoelement. A remote recorder indicates the temperature of the molten steel as a function of the electromotive force developed. The handle must be sufficiently long for safely immersing the sensing head, generally through a porthole in the furnace wall.

Evidently, with molten steel temperatures in the range of 2800° F. to 2950° F., most materials deteriorate and, up to the present time, the entire head, including the thermoelement, was destroyed; or, in cases where the thermocouple wires are integrally attached to the elongated supporting handles, other expensive elements, such as protecting components, were destroyed. Therefore, the costs of each reading were high due to the loss of material and labor, and time consuming maintenance steps were required between each of a series of readings.

Reducing the costs of measuring the temperature of molten metal is therefore the principal object of this invention. Another object of the present invention is to prevent deterioration of an entire, comparatively costly temperature measuring unit. Providing a removably mounted sensing element subassembly, and protecting it sufficiently from deterioration by the heat to which it is exposed, so that the same subassembly may be used repeatedly form collateral objects of this invention.

Another object of the invention is to facilitate assemblying the components of immersion thermocouple temperature measuring devices locally in the furnace area, for speeding up the step of repeatedly taking the temperature of molten steel or other metal and also for ensuring that electrical continuity is established between the sensing thermocouple and the registering equipment.

In accordance with one illustrative embodiment of the invention, an immersion thermocouple temperature measuring device includes some inexpensive protecting parts which will be destroyed in the course of taking a reading, and some more expensive components, including the precious metal thermocouple which may be re-used in successive readings. A head of refractory material which is used but once has a small quartz tube protruding from its front surface. The usual cup shaped steel "melt-away" cap protects the quartz tube prior to use. The outer end of the quartz tube is closed. The open end of the quartz tube is secured in a aperture in the head through which the thermocouple junction may be inserted into the quartz tube. At the surface of the head to which the quartz tube is secured the aperture is relatively small and may be cylindrical in form. Toward the side of the head away from the quartz tube the aperture is enlarged to form a generally rectangular recess. The head with the quartz tube so described actually constitutes the only component which will be deteriorated by immersion into molten metal. The thermocouple with its hot junction located in the protruding portion of the quartz tube is removably maintained in this position by means of a plug. Provided with a pair of connector pins, the plug fits into the mentioned enlarged rectangular recess and the free ends of the thermocouple wires are secured to the pins. It is noted that the thermocouple is secured only to the plug and, therefore, can be assembled with the head or removed from it by inserting the plug into or removing it from the recess in the head. After use for one reading and disassembling the head from the handle, the thermocouple secured to the plug is separated from the then useless head with the quartz tube and may serve repeatedly with other new head-quartz tube assemblies.

It is conventional with thermocouple temperature measuring devices of the type contemplated herein to protect the elongated handle, which supports the head, with cardboard tubes formed with intermediate layers of refractory material, sometimes termed "tapping tubes." The time required for obtaining correct readings is generally about 5 seconds and during this short interval and at the temperatures of molten steel the cardboard is subject to carbonisation but the tapping tube as a whole serving as a shield still affords sufficient protection against splashing for the handle extending through it. It is contemplated that the head with the removably mounted plug-thermocouple described above is to be used with a tapping tube, and the head is therefore designed to fit into the end of such a tube. It has been found by tests that the plug-thermocouple assembly is sufficiently shielded by the tapping tube for preserving the more expensive component which includes the thermocouple itself.

In accordance with a feature of the invention, a high temperature measuring assembly includes a head, a support secured to one side of the head, a small insulating tube secured to the other side of the head, a thermocouple assembly removably secured in the head with the thermocouple junction extending into the insulating tube, and a shield for protecting the support and the thermocouple assembly. More specifically, as another feature of the invention, the lead-in conductors in the form of connector pins through the above mentioned plug assume the role of a support for maintaining the thermocouple in its position with respect to the quartz tube.

Additional features of this invention include the shape of the aperture through the above mentioned head. The aperture includes two portions, of which the first, cylindrical portion receives the open end of the quartz tube while the second forms a recess in he head for receiving the plug-thermocouple assembly and a socket cooperating with the pins of the plug for conveniently connecting the lead-in wires to the thermocouple regardless of the angular position of the plug with the pins with respect to the socket. Such a socket-plug assembly has been found useful especially in conjunction with the immersion thermocouple device herein described since, when assembling the components, the tapping tube covers the plug and the socket so that by eliminating angular orientation the step of asssembling is greatly facilitated. Claims generic to this aspect of the present disclosure are in Moore Patent No. 3,024,295.

Other objects, features and advantages of the invention will become apparent from a consideration of the following detailed description and from the drawings, in which:

FIGURE 1 is a side view of one embodiment of an immersion thermocouple temperature detector, partly in section;

FIGURE 2 is a sectional view of the head of FIGURE 1;

FIGURE 3 is an end view of the head of FIGURE 2;

FIGURE 4 is a sectional detail view of the plug-thermocouple subassembly of FIGURE 2;

FIGURE 5 is a sectional view of the socket of FIGURE 1;

FIGURE 6 is a front view of the socket of FIGURE 5;

FIGURE 7 shows another embodiment of the circular spring contact for the socket of FIGURE 5;

FIGURE 8 is a side view of the spring contact of FIGURE 7; and

FIGURE 9 is a still further embodiment of the circular contact of FIGURE 5.

Referring to FIGURE 1, the device described hereinafter, when entirely assembled, is about 50 inches long for safely immersing the end which supports the thermocouple into molten metal for about 5 seconds. This is the approximate interval required for obtaining a complete and reliable reading. Steel temperatures may be measured in both open hearth or electric furnaces by immersing the sensing head through the porthole of the furnace.

The sensing head 10, generally in the shape of a short cylinder or drum is provided with a flange 12 which serves as a stop when the head is pressed into the above mentioned protective "tapping" tube 14 of refractory-reinforced cardboard. The head 10, when assembled with the sensing element, a protective cap 16 and a socket 18, all of which are described more detailed hereinafter, are supported by and attached to an iron tube 20 by means of a coupling 22. The iron tube terminates in a handle 24 from which a lead-in cable 26, extending through the tube 20, emerges for connection to a recorder (not shown).

FIGURE 2 is a sectional view of the sensing head 10 after assembly with the thermocouple and an end view of this sub-assembly is shown in FIGURE 3. An aperture extends through the body of the head which connects the left hand and the right hand faces of the head in FIGURE 2. Towards the left, the aperture forms a cylindrical bore 28 which receives the open end of a quartz tube 30. The closed end of the quartz tube protrudes outwardly from the head 10 and the tube is sealed into the bore 28 by means of an appropriate heat resistant cement as indicated by the numeral 32. The remaining portion of the aperture in the head 10 forms an enlarged recess 34 with rectangular cross section into which a removable plug 36 of refractory material may be fitted. In the illustrated embodiment the recess 34 is located off-center with respect to the head 10. If desired, the plug may have one pair of facing side walls 37 and 39 slightly inclined to form a wedge pointing toward the recess to obtain an improved fit by friction with the correspondingly inclined surfaces of the recess. Two connector pins 38 and 40 extend through the plug 36 and support a pair of thermocouple wires 42 and 44, respectively. The recess 34 and the plug are dimensioned so that the pin 38 lies in the center line of the head while the pin 40 is, parallel with the pin 38, but excentrically arranged. The purpose of this arrangement will become apparent from the description of the socket of which the especially designed female contacts engage the pins 38 and 40.

In FIGURE 4, the sub-assembly of the plug with the connector pins and the thermocouple secured to the pins by crimping, welding or the like is shown when removed from its assembled position with the head 10. FIGURE 4 illustrates, in addition, a quartz capillary 46 which encompasses the wire 42 and extends substantially over the entire length of the wire from the thermojunction 48 to the end of the pin 38. When mounting the thermocouple assembly of FIGURE 4 into the head as shown in FIGURE 2, the thermocouple wires are introduced into the quartz tube 30 and the junction 48 becomes located in the closed tip portion of the quartz tube 30. Contact between the thermocouple wires 42 and 44 is prevented by the capillary 46. In order to avoid mechanical damage to the quartz tube 30 when the device is stored, shipped and, likewise, at the moment when it is immersed into molten metal, the head is provided with the steel cap 16 mentioned in connection with FIGURE 1 and shown in FIGURES 1 and 2. The top melts off immediately upon immersion into the melted metal and this effect is accelerated by the provision of one or more holes 50 through it.

FIGURES 5 and 6 show the socket or receptacle 18 cooperating with the plug 36 for connection to the recorder (not shown), by means of the lead-in cable 26. In addition, the coupling 22 engaging one, threaded end of the iron tube 20, frictionally holds with its other end the socket 18, as shown in FIGURES 1 and 5. It will be apparent that, since the cable 26 extends through the protecting iron tube 20, the head 10 with the thermocouple-supporting plug 36 mounted in it must be assembled at first with the cardboard tube 14 and, only then, the iron tube 20 with the coupling 22 and the socket 18 can be introduced into the cardboard tube until the socket makes contact with the pins 38 and 40 of the plug 36. Evidently, the operator can not see and observe the connector pins and the counter contacts hidden from his sight by the cardboard tube 14.

In order to facilitate the task so described, the invention includes a plug-socket assembly especially useful in the immersion thermocouple assembly herein contemplated. Generally speaking, such an assembly includes an electrical plug having a first, centrally arranged contact member and a second, eccentrically arranged contact member, as represented by the head 10 with the plug 36 and the connector pins 38 and 40 fitted into it as described above. The cooperating socket is provided with a circular counter contact for making contact with the eccentrically arranged connector pin 40 at any one of the locations along its circular extent. The centrally located pin 38 is suitably simultaneously received in a conventional female connector. By the fact that the center pin 38 protrudes further than the eccentrical pin, it serves to guide the socket and the plug in any of all the possible contact making positions. At leaset one of the contact making elements should be constructed to resiliently engage the cooperating element for retaining the components of the assembly in their respective positions and to prevent rotation of the parts involved.

The cooperation of the plug-socket assembly will be more clearly understood by reference to the drawings. One embodiment of a socket for use with the immersion thermocouple herein described is shown in FIGURES 5 and 6. The socket 18 consists basically of a cylindrical insulating body 52 provided with an axially extending bore 54 which receives a conventional, split female connector 56 maintained in its position by means of a screw 58 which also serves to connect one lead of the cable 26. In addition, the body 52 is provided with an annular recess 60 into which is fitted the circular counter contact mentioned above. Formed from thin copper sheet, this counter contact has the shape of an annular channel with inner side walls 62 and outer sidewalls 64. The edges of the side walls are suitably shaped as shown in FIGURE 5 for facilitating engagement with the eccentric pin 40 of the assembly including the plug 36 and the head 10 shown in FIGURE 2. FIGURE 5 shows, furthermore, a circular area 66 of restricted diameter in the outer wall 64 of the channel for improving the frictional engagement with the pin after assembly. The channel-shaped annular contact is maintained in the recess 60 by means of a pair of tongues 68 which extend through the insulating body 52 and support terminal screws, one of which, designated by the numeral 70, is used for connection with the other wire of the insulated cable 26.

The socket fits tightly into the coupling 22 which threadably engages the protective iron pipe 20. When inserting this assembly from one end into the cardboard tube 14 with the head 10 in its other end, at first the center pin 38 engages the female connector 56 of the socket 18. Subsequently, the eccentrically mounted, shorter pin 40 enters the circular recess 60 of the socket to make contact with the sidewalls 62 and 64 of the channel-shaped counter contact. It will be apparent that this occurs at any angular position of the socket 18 with respect to the head-plug assembly, due to the concentric arrangement of the contact channel around the centrally arranged female contact 56. The resiliency of the channel contact obtained by the restricted diameter area 66 provides a good electrical and mechanical connection, so that electrical continuity is ensured and any rotating movement is prevented. By the arrangement so described, assembly of the immersion thermocouple temperature measuring device is greatly facilitated, which fact is of great significance when considering that assembly and disassembly are made locally in the furnace area.

An alternate modification of the channel-shaped annular counter contact to be mounted in the socket body 52 of FIGURE 5 is shown in section in FIGURE 7, and in a sideview of FIGURE 8. The assembly includes a cylindrical insulating support 72 provided with a flange 74, and a spring contact 76 formed from a copper sheet strip by a great number of cuts 78. The contact member 76 is secured to the flange 74 by screws 80 to obtain resilient tongues in a circular arrangement. The resultant annular channel contact assembly is provided with tongues 82 similar to those designated by the numeral 68 in FIGURE 5. These tongues are used for securing the support 72 with the annular spring contact 74 secured to it in the insulating body 52 of the socket 18.

A still further embodiment of the circular channel contact is shown in section in FIGURE 9. The copper ring 84 with U-shaped cross section formed by an annular recess 86, is intended to cooperate with the pin 40 of FIGURE 2. In view of the rigidity of the ring 84, the pin 40 must be the resilient component in this case. This may be accomplished by using split pins, as an example. The ring 84 fits into the recess 60 of the socket and is maintained by tongues 82, similarly to the circular channel contact of FIGURE 5. Tapped holes 88 and 90 are provided in the bottom of the recess 86 for attaching the tongues 82 to the ring 84 by means of screws 92 and 94.

It will be obvious to those skilled in the art that many more modifications may be made within the scope of the present invention without departing from the spirit thereof, and the invention includes all such modifications.

What is claimed is:

1. In a high-temperature immersion thermocouple assembly, a head of refractory material having an aperture through it, a quartz tube having a closed and an open end, the tube having its open end permanently sealed into one end of said aperture to protrude outwardly from said head, the protruding end of said quartz tube being closed, a pair of thermocouple wires extending through said aperture into said quartz tube, the thermocouple wires having a junction located in the protruding quartz tube portion, a removable plug fitted into the other end of said aperture, said plug supporting the free ends of said thermocouple wires for removably maintaining said thermocouple wires in their position with respect to the quartz tube so that said thermocouple wires and said plug are removable from said head without removal of said quartz tube, and heat-resistant means for immersing said head into and retracting it from melting metal.

2. In a high temperature immersion thermocouple assembly, a head of refractory material having an aperture through it, a quartz tube having a closed and an open end, the tube having its open end permanently sealed into one end of said aperture to protrude outwardly from said head, the protruding end of said quartz tube being closed, a pair of thermocouple wires extending through said aperture into said quartz tube, the thermocouple wires having a junction located in the protruding quartz tube portion, a removable plug fitted into the other end of said aperture, said plug supporting the free ends of said thermocouple wires for removably maintaining said thermocouple wires in their position with respect to the quartz tube so that said thermocouple wires and said plug are removable from said head without removal of said quartz tube.

3. In a high-temperature immersion thermocouple assembly, a head of refractory material having an aperture through it, a quartz tube having a closed and an open end, the tube having its open end sealed into one end of said aperture to protrude outwardly from said head, the protruding end of said quartz tube being closed, a pair of thermocouple wires extending through said aperture into said quartz tube, the thermocouple wires having a junction located in the protruding quartz tube portion, a removable plug of refractory material fitted into the other end of said aperture, a pair of connector pins secured to and passing through said plug, each of the free ends of the thermocouple wires being connected to one of said pins for removably maintaining said thermocouple wires in their position with respect to said quartz tube so that said thermocouple wires and said plug are removable from said head without removal of said quartz tube, heat resistant support means for immersing said head into and retracting it from molten metal, and electrical lead-in means passing through said support means for making contact with said pins.

4. In a high temperature measuring device, an expendable head, a thermocouple assembly structurally distinct from and removably mounted within a recess in said head; a quartz tube carried by said head, said quartz tube being closed at one end and having the other end inserted in said recess, said thermocouple assembly comprising a pair of thermocouple wires joined together at one of their ends to form a thermocouple, a removable plug fitted into said recess of said head, said plug supporting the free ends of said thermocouple wires for removably maintaining said thermocouple within said quartz tube of said head so that said thermocouple and said plug are removable from said head without removal of said quartz tube, said plug also having first electrical contact means comprising first, centrally arranged and second, eccentrically arranged connector pins; and a support structurally distinct from said head and including second electrical contact means and cooperating with said first electrical contact means comprising a socket including a first, centrally located female contact for engaging said first pin and a second, annular contact arranged concentrically with respect to but insulated from said first contact for engaging said second pin regardless of the angular position of said socket with respect to said plug.

5. In a high temperature measuring device, an outer protective assembly, an inner replaceable assembly structurally distinct from and removably mounted within said outer assembly comprising a head of refractory material having an aperture through it, a quartz tube having a closed end and an open end, the tube having its open end permanently sealed into one end of said aperture to protrude outwardly from said head, the protruding end of said quartz tube being closed; said inner assembly including a thermocouple comprising a pair of thermocouple wires joined together at one of their ends to form a thermocouple junction, an insulating member removably positioned in the other end of said aperture and supporting the free ends of said thermocouple with the thermocouple junction being located in the protruding quartz tube portion so that said thermocouple and said insulating member are removable from said outer protective assembly without removal of said quartz tube, first electrical contact means comprising a pair of electrical contacts secured to said insulating member and connected to said free thermocouple ends, and a support structurally distinct from both said outer assembly and said inner assembly and including second electrical contact means cooperating with said first electrical contact means.

6. In a high temperature measuring device, an outer protective assembly, an inner replaceable assembly structurally distinct from and removably mounted within said outer assembly and including a thermocouple comprising a pair of thermocouple wires joined together at one of their ends to form a thermocouple junction; said outer assembly comprising a head of refractory material having an aperture through it, a quartz tube having a closed and an open end, the tube having its open end permanently sealed into one end of said aperture to protrude outwardly from said head, the protruding end of said quartz tube being closed; said inner assembly including a removable plug fitted into the other end of said aperture, said plug supporting the free ends of said thermocouple wires for removably maintaining said thermocouple junction within said protruding quartz tube portion so that said plug and said thermocouple are removable from said outer protective assembly without removal of said quartz tube; said inner assembly also including first electrical contact means connected to said thermocouple; and a support structurally distinct from both said outer assembly and said inner assembly and including second electrical contact means cooperating with said first electrical contact means.

7. In a high temperature measuring device, an outer protective assembly comprising a head of refractory material having an aperture through it, a quartz tube having a closed and an open end, the tube having its open end permanently sealed into one end of said aperture to protrude outwardly from said head; an inner replaceable assembly structurally distinct from and removably mounted within said outer assembly and including a thermocouple comprising a pair of thermocouple wires joined together at one of their ends to form a thermocouple junction; said inner assembly comprising a plug removably fitted into the other end of said aperture, said plug having first electrical contact means comprising first centrally arranged, and second, eccentrically arranged connector pins, said pins supporting the free ends of the thermocouple wires for removably maintaining said thermocouple junction within the protruding end of the quartz tube so that said plug and said thermocouple are removable from said outer protective assembly without removal of said quartz tube; and a support structurally distinct from both said outer and said inner assembly and including second electrical contact means cooperating with said connector pins; said second electrical contact means comprising a socket including a first, centrally located female contact for engaging said first pin and a second, annular contact arranged concentrically with respect to but insulated from said first contact for engaging said second pin at any location of said annular contact in accordance with the angular position of said socket with respect to said plug.

References Cited by the Examiner
UNITED STATES PATENTS

| | | | |
|---|---|---|---|
| 1,937,199 | 11/1933 | Kathner | 136—4.7 |
| 2,051,549 | 8/1936 | De la Hunt | 339—184 |
| 2,078,154 | 4/1937 | Okino | 339—184 |
| 2,103,548 | 12/1937 | Obermaier | 136—4.72 |
| 2,463,427 | 3/1949 | Richards | 136—4.77 |
| 2,556,238 | 6/1951 | Tingle | 136—4.7 |
| 2,642,468 | 6/1953 | Dodson | 136—4.73 |
| 2,649,489 | 8/1953 | Turkington | 130—4.72 |
| 2,719,279 | 9/1955 | Muckler | 339—177 |
| 2,735,079 | 2/1956 | Passarelli | 339—20 X |
| 2,887,667 | 5/1959 | Wolfe et al. | 339—177 |
| 2,993,944 | 7/1961 | Silver | 136—4.7 |
| 2,999,121 | 9/1961 | Mead | 136—4.7 |
| 3,024,295 | 3/1962 | Moore | 136—4.7 |

WINSTON A. DOUGLAS, *Primary Examiner.*

JOHN H. MACK, JOHN R. SPECK, ALLEN B. CURTIS, *Examiners.*

J. H. BARNEY, *Assistant Examiner.*